(12) United States Patent (10) Patent No.: US 12,627,774 B2
Schooley (45) Date of Patent: May 12, 2026

(54) SYSTEMS, DEVICES, AND RELATED METHODS FOR USING SCAN DATA TO SIMPLIFY LOSS PREVENTION ACTIVITIES

(71) Applicant: Datalogic IP Tech S.r.l., Lippo di Calderara di Reno (IT)

(72) Inventor: Carl Schooley, St. Albans (GB)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 0 days.

(21) Appl. No.: 18/420,440

(22) Filed: Jan. 23, 2024

(65) Prior Publication Data

US 2024/0251062 A1 Jul. 25, 2024

Related U.S. Application Data

(60) Provisional application No. 63/481,138, filed on Jan. 23, 2023.

(51) Int. Cl.
| | |
|---|---|
| *G06Q 10/08* | (2024.01) |
| *G06K 7/14* | (2006.01) |
| *G06Q 10/087* | (2023.01) |
| *H04N 5/76* | (2006.01) |
| *H04N 7/18* | (2006.01) |

(52) U.S. Cl.
CPC ........... *H04N 7/183* (2013.01); *G06K 7/1413* (2013.01); *G06K 7/1417* (2013.01); *G06Q 10/087* (2013.01); *H04N 5/76* (2013.01)

(58) Field of Classification Search
CPC ............. G06Q 10/08; H04N 7/18; G06K 1/00
USPC ......................................... 348/143, 142, 61
See application file for complete search history.

(56) References Cited

U.S. PATENT DOCUMENTS

| | | | |
|---|---|---|---|
| 11,010,903 B1 * | 5/2021 | Gallaudet .............. | G06V 20/46 |
| 2023/0237428 A1 * | 7/2023 | Francis .................. | G06Q 10/08 |
| | | | 705/28 |

* cited by examiner

*Primary Examiner* — Daquan Zhao
(74) *Attorney, Agent, or Firm* — Stoel Rives LLP

(57) ABSTRACT

The disclosure includes a security system for a fulfillment center environment that is correlated with output scan data from a scanner operated by an attendant fulfilling an order request. The security video camera may capture video data within its field-of-view, and a security video server may be configured to: receive output scan data from the scanner for an order fulfillment session; generate a video clip from the video data corresponding to the order fulfillment session; and present the video clip for review in response to a request to review the order fulfillment session. Related scanners and methods are also disclosed.

20 Claims, 2 Drawing Sheets

100

| Scanner(s) 106 | Security Video Server(s) 104 | Security Video Camera(s) 102 |

200A

200B

SYSTEMS, DEVICES, AND RELATED METHODS FOR USING SCAN DATA TO SIMPLIFY LOSS PREVENTION ACTIVITIES

RELATED APPLICATIONS

This application claims the benefit of U.S. Provisional Application No. 63/481,138, filed Jan. 23, 2023, and entitled "Systems, Devices, and Related Methods for Using Scan Data to Simplify Loss Prevention Activities," the disclosure of which is incorporated by reference herein in its entirety.

TECHNICAL FIELD

The present disclosure relates generally to scanners or code readers, and more particularly, to scanners or code readers employed within fulfillment centers.

BACKGROUND

E-commerce fulfillment centers currently struggle to identify responsibility for lost and stolen items. If they cannot prove that the item was picked and packed correctly, fulfillment centers typically accept the loss and refund the customer. Conventional CCTV systems often require manually searching to find when the order was packed. This is not cost effective, and the loss is usually not investigated.

BRIEF SUMMARY

A security system for a fulfillment center environment may comprise a security video camera configured to capture video data within its field-of-view; a security video server operably coupled to the security video camera and to a scanner that is operated by a user fulfilling an order, the security video server configured to: receive output scan data from the scanner for an order fulfillment session; generate a video clip from the video data corresponding to the order fulfillment session; and present the video clip for review in response to a request to review the order fulfillment session.

A scanner configured for use in connection with a security system in a fulfillment center environment may comprise: an imager configured to capture one or more images of an item; and a processor operably coupled to the imager. The processor may be configured to: start an order fulfillment session; identify the item from the one or more images; transmit scanner output data to the security system for associating the scanner output data with security video data of the security system; and close an order fulfillment session.

A method for correlating scan data with security data during an order fulfillment session may comprise identifying an item with a scanner for including the item in a package during an order fulfillment session; transmitting scanner output data from the scanner to a security video server for the order fulfillment session; capturing video data from a security video camera; generating a video clip from the video data corresponding to the order fulfillment session; storing the video clip and the scanner output data with a correlation to the order fulfillment session; and retrieving the video clip and the scanner output data in response to a request to review the order fulfillment session.

DETAILED DESCRIPTION

Figure 1:
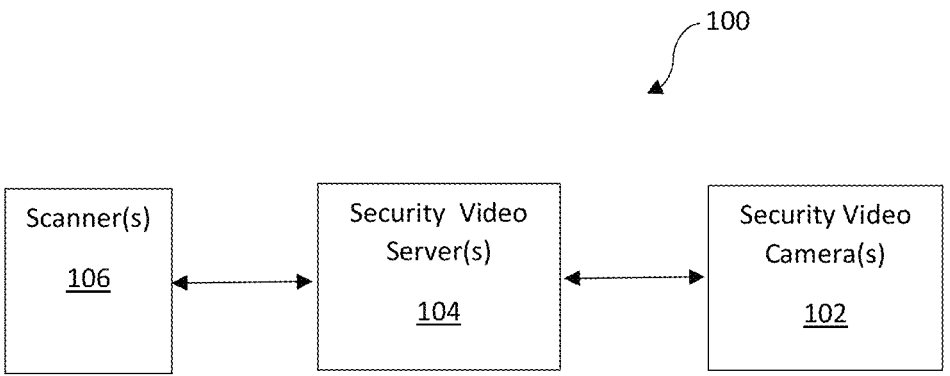
FIG. 1 is a simplified block diagram of a security system may be used in a fulfillment center or other similar environment.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

"Image data" as used herein includes both individual frames as well as multiple frames (e.g., streaming video). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems.

Embodiments of the disclosure may create a bookmark in the security video data (e.g., from a CCTV system or other security video system) when an order is packed for fulfillment. As a result, the footage can be retrieved immediately responsive to a request. This may improve the ability to prove responsibility, thereby reducing cost of fraudulent reports of loss or damage. Genuine losses due to staff theft can also be identified and addressed.

FIG. 1 is a simplified block diagram of a security system 100 may be used in a fulfillment center or other similar environment. The security system 100 includes one or more security video cameras 102 that are configured to capture and record video data that is transmitted to a security video server 104 for storage and/or additional analysis. In some embodiments, the security video server 104 may be in communicate with (or part of) a warehouse management system (WMS) that is used to administer warehouse operations.

The user may operate one or more scanners 106 during the order fulfillment process to scan and record the items being placed into the package for shipment. Typically, the scanners 106 may generate a list of items to confirm that the correct items are being added to the order according to the order details as they are being scanned and placed into the packaging. Such scanners 106 may be image-based and/or laser-based scanners that are configured to identify optical indicia on the packaging, such as barcode data (e.g., 1D, 2D barcodes, etc.), watermarks (e.g., Digimarc), text or other features (e.g., colors, logos, alphanumeric characters, etc.) via a variety of decoding algorithms and object recognition techniques (e.g., optical character recognition, neural networks, machine learning, etc.) known in the art. The scanners 106 may include stationary scanners, such as may be installed over a workspace or conveyor system, such as the Matrix™ line of products available from Datalogic of Bologna, Italy. The scanners 106 may also include other forms of scanners, such as presentation scanners, handheld scanners, mobile computers, wearable scanners, etc.

The output data (e.g., image data, decoded data, metadata including timestamps, etc.) from the scanners 106 may be transmitted to the security video servers 104 and/or other host device that may be configured to combine the order details, images of the products being scanned, and a video recording of the packing process from the security video cameras 102. This set of combined data may be stored within a corresponding record on the server 104, which may be a dedicated server for storing such data from processed orders. As a result, all relevant available data may be easily retrieved for a particular order or customer for review at a later stage if required.

In operation, the security video server 104 may receive a customer order number when the unique picking list barcode is scanned by the scanner 106. This may create a new folder on the security video server 104. As individual products are scanned by the scanner 106, each image of each product may be transmitted from the scanner 106 to the security video server 104 (e.g., via FTP) to be saved in the newly created folder. In some embodiments, the image data may include a single image, such as the image used to successfully decode the indicia to identify the product. In some embodiments, the image data may include a sequence of images (e.g., including video) captured by the scanner 106 while the product is within its field of view. In some embodiments, the image data may include a composite image derived from multiple images that is reconstructed to show a more complete view of the product to assist with later review. Such data may be sent item by item as each item is read, while some embodiments may send all relevant data to the security video server 104 as a batch when the order is complete.

When the order is completed, the scanner 106 may initiate an order complete (e.g., termination) signal to the security video servers 104 and/or security video cameras 102. As a result, the video recording of the order fulfillment session may be saved in the folder corresponding to the particular order. The process then starts again for the next order. Later, the folder may be retrieved by just entering a customer order number on the server 104, where all evidence can be found (e.g., barcode log data, scanner images, security video, etc.). As a result, it may be easier to prove if theft or damage has occurred, if the order was correctly fulfilled, etc. This may save the security video operator from manually searching through hours of footage across multiple packing areas, which is not cost effective and a reason why E-commerce companies often just accept the loss and pay compensation to the customer. In some embodiments, the scanner 106 may create a record for starting an order and completing an order with a corresponding time stamp. This may create a bookmark for one or more security cameras to clip and save security video data that is time correlated with the order fulfillment session. In some embodiments, the security video clip may be generated responsive to the order complete signal and saved for a later time. In this case, a separate order fulfillment security video file may be stored in each folder for each order. In some embodiments, the security video clip may be generated responsive to a review request for a particular order. In such an embodiment, the start/stop times from the bookmark for a particular saved video stream may be retrieved to clip the requested video at a later time on demand. Such security video and/or order security video clips, images, etc. may be saved for a period of time according to a retention policy, which may be for the entire duration that a customer may initiate a request after receiving the order.

Figure 2A:
FIGS. 2A-2B show screenshots of a video review portal for the security video server according to an embodiment of the disclosure.
Figure 2B:
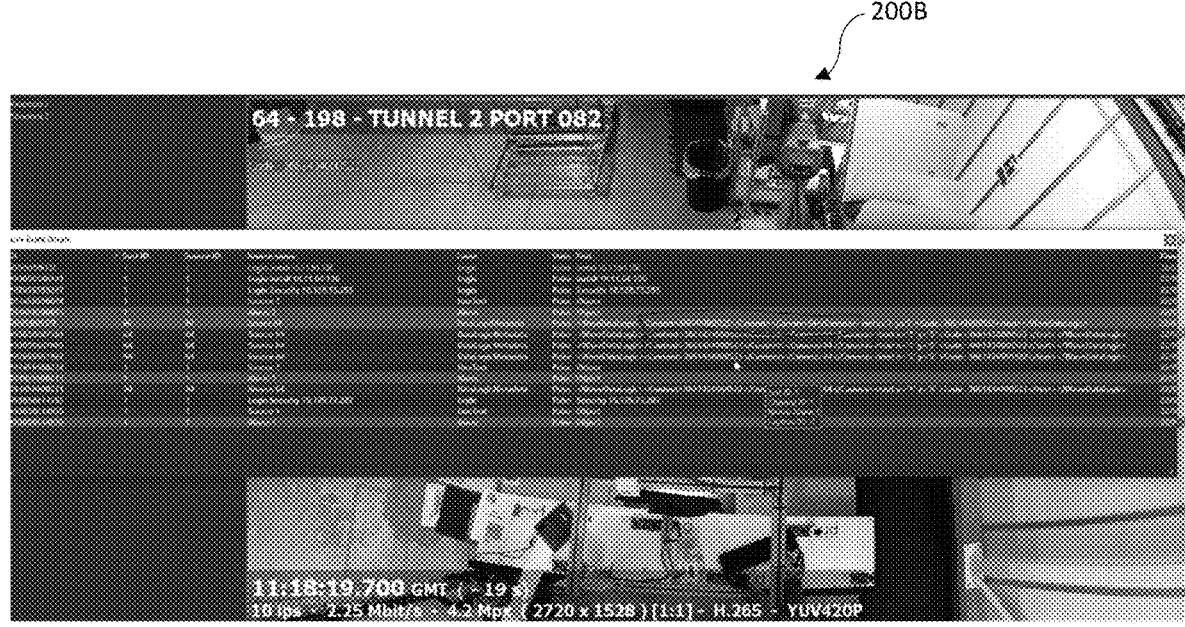

FIGS. 2A-2B show screenshots 200A, 200B of a video review portal for the security video server 104 according to an embodiment of the disclosure. Order records may be searched by order number, customer number, or other relevant identifier and all stored data from that order fulfillment session may be accessed and reviewed. For example, one or more security video clips (e.g., from one or more camera views) may be reviewed and viewable through the portal. A transaction log of the scanned items may be retrieved, as well as one or more images captured by the scanner may also be accessed and reviewed. As a result, a more complete record of the entire fulfillment session may be easily accessed for confirming the status of the items at the time of packaging and identifying any suspicious behavior by the packing attendant.

As a result, embodiments of the disclosure may improve processes for E-commerce fulfillment companies that are interested in preventing revenue loss through loss and theft. No additional investment is required for such companies, as scanners are typically used to scan their products before being packed. Linking the scanner output to the security system data may improve the operation of such systems, resulting in savings from reduced loss and saving personnel time when investigating customer claims of lost, damaged, or missing products. Packing staffers may also benefit from increased trust from their managers by having a more clear record of the packing session.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A security system for a fulfillment center environment, comprising:
   a security video camera configured to capture video data within its field-of-view;
   a security video server operably coupled to the security video camera and to a scanner that is operated by a user fulfilling an order, the security video server configured to:
      receive output scan data from the scanner for an order fulfillment session;
      generate a video clip from the video data corresponding to the order fulfillment session, wherein the video clip is generated in response to receiving an order complete signal from the scanner, and the video clip is saved in a folder corresponding to the order for later review; and
      present the video clip for review in response to a request to review the order fulfillment session.

2. The security system of claim 1, wherein the scanner is at least one of a stationary scanner, a mobile computer, a presentation scanner, a wearable scanner, or a handheld scanner.

3. The security system of claim 1, wherein the output scan data includes a transaction log generated by the scanner.

4. The security system of claim 1, wherein the output scan data includes one or more images of each item scanned by the scanner during the order fulfillment session.

5. The security system of claim 1, wherein the output scan data includes a start time and a stop time for the order fulfillment session.

6. The security system of claim 5, wherein the video clip is generated in response to receiving a request to review the order fulfillment session on demand.

7. The security system of claim 1, wherein the folder is created in response to receiving an order start signal from the scanner.

8. The security system of claim 1, wherein the scanner is configured to send the output scan data item by item to the security video server.

9. The security system of claim 1, wherein the scanner is configured to send the output scan data item as a batch to the security video server.

10. The security system of claim 9, wherein the batch includes the entire batch of data from the order fulfillment session.

11. The security system of claim 1, wherein the folder is associated with a unique identifier and created as a new folder in response to a barcode being scanned by the scanner, and wherein the folder is accessible by the user for review in response to entering the customer order number via portal of the security video server.

12. The security system of claim 11, wherein the unique identifier includes at least one of an order number or customer number.

13. A method for correlating scan data with security data during an order fulfillment session, the method comprising:
   identifying an item with a scanner for including the item in a package during an order fulfillment session;

US 12,627,774 B2

7 transmitting scanner output data from the scanner to a security video server for the order fulfillment session;

capturing video data from a security video camera;

generating a video clip from the video data corresponding to the order fulfillment session in response to receiving an order complete signal from the scanner, and the video clip is saved in a folder corresponding to the order for later review;

storing the video clip and the scanner output data with a correlation to the order fulfillment session; and retrieving the video clip and the scanner output data in response to a request to review the order fulfillment session.

14. The method of claim 13, wherein the scanner is at least one of a stationary scanner, a mobile computer, a presentation scanner, a wearable scanner, or a handheld scanner.

15. The method of claim 13, wherein the scanner output data includes a transaction log generated by the scanner, one or more images of each item scanned by the scanner during the order fulfillment session, and a start time and a stop time for the order fulfillment session.

16. The method of claim 13, wherein generating the video clip is in response to receiving a request to review the order fulfillment session on demand.

17. The method of claim 13, further comprising creating the folder in response to receiving an order start signal from the scanner.

18. The method of claim 13, wherein the scanner output data is transmitted item by item from the scanner to the security video server.

19. The method of claim 13, wherein the scanner output data is transmitted from the scanner as a batch to the security video server.

20. The method of claim 19, wherein the batch includes the entire batch of data from the order fulfillment session.

* * * * *